United States Patent

[11] 3,572,754

| [72] | Inventor | Stanley B. Fowler<br>Flint, Mich. |
|---|---|---|
| [21] | Appl. No. | 841,079 |
| [22] | Filed | July 11, 1969 |
| [45] | Patented | Mar. 30, 1971 |
| [73] | Assignee | General Motors Corporation<br>Detroit, Mich. |

[54] VEHICLE STEP ARRANGEMENT
5 Claims, 5 Drawing Figs.

[52] U.S. Cl. .................................................. 280/166, 105/447
[51] Int. Cl. ...................................................... B60r 3/02
[50] Field of Search.......................................... 280/166; 105/447, 443; 244/129 (D)

[56] References Cited
UNITED STATES PATENTS

| 2,146,668 | 2/1939 | Baade........................... | 280/166 |
| 2,226,717 | 12/1940 | Haessler....................... | 105/447 |
| 3,408,959 | 11/1968 | Cripe et al. .................. | 280/166 |

Primary Examiner—Leo Friaglia
Assistant Examiner—Robert R. Song
Attorneys—W. E. Finken and D. L. Ellis ABSTRACT: In a bus-type vehicle ingress and egress of passengers is carried out through a door opening the upper portion of which is closed by a swingably mounted door and the lower portion of which is closed by a step and platform arrangement selectively movable between a raised position wherein a portion of the step and platform structure is movable to either close the door opening or open the opening and provide a high level platform for passenger ingress and egress at vehicle floor level, and a lowered position wherein it provides a plurality of steps between ground level and vehicle floor level.

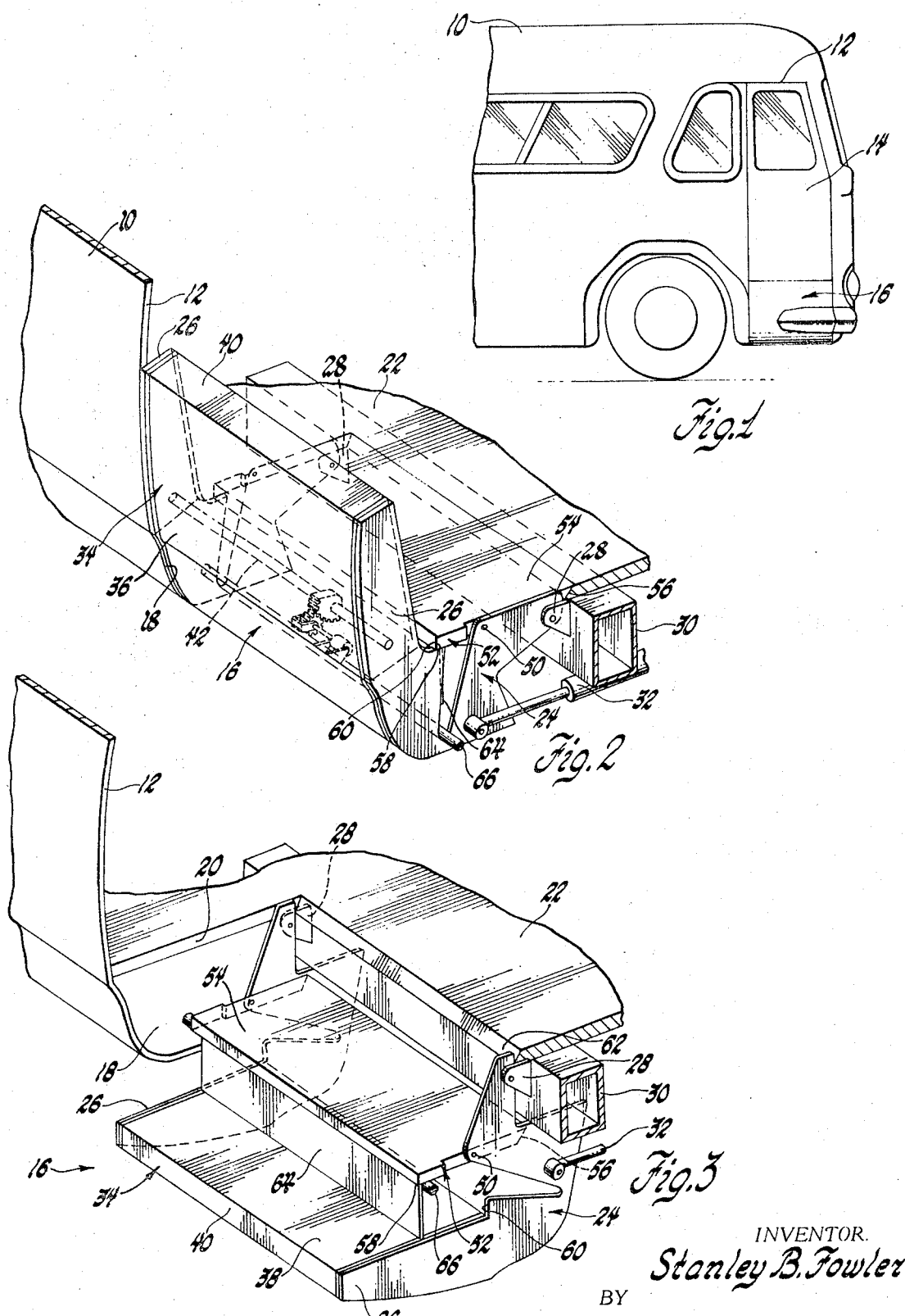

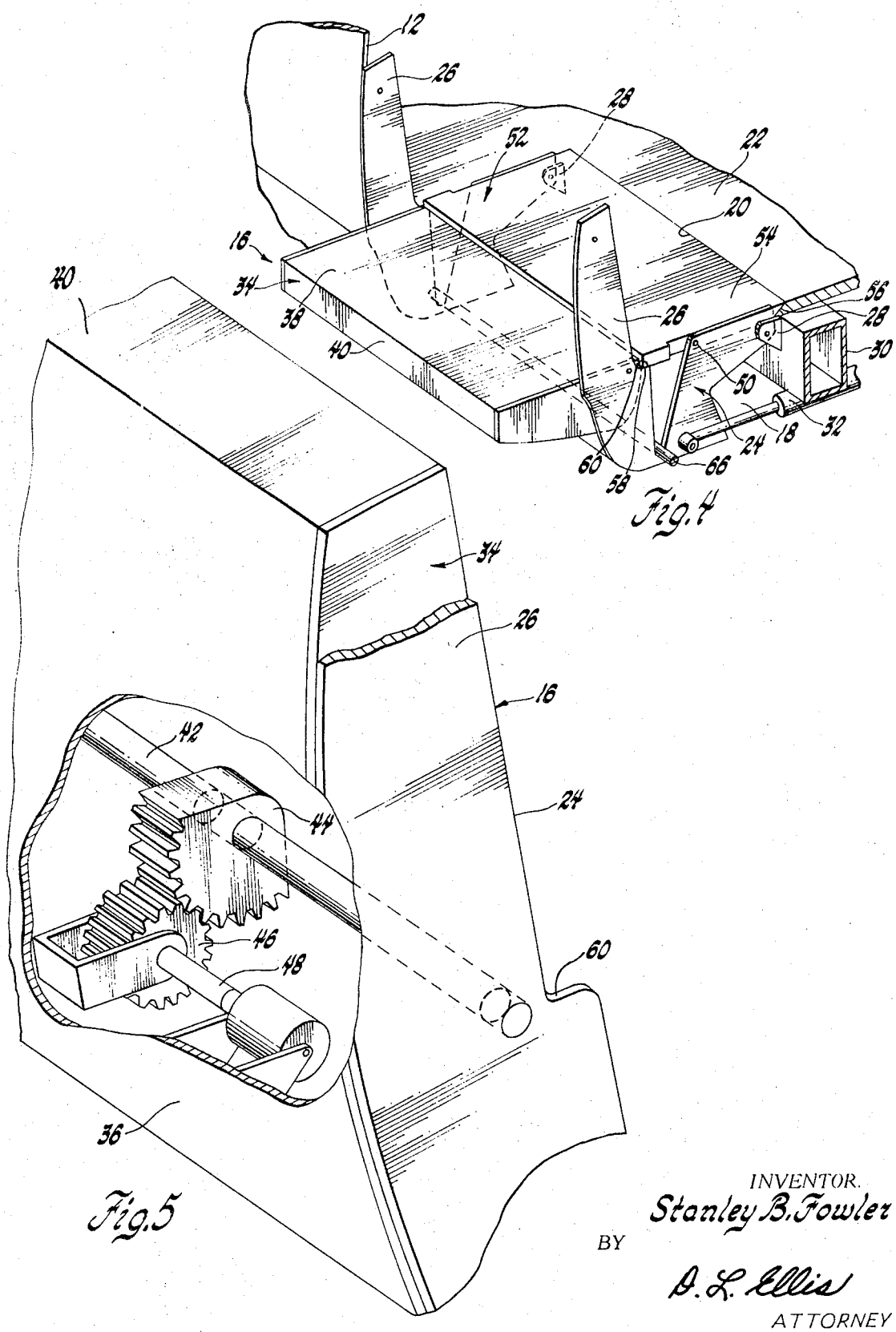

1

VEHICLE STEP ARRANGEMENT

The primary feature of this invention is that it provides a new and improved step and platform arrangement for buses, railroad cars or like vehicles. Another feature of this invention is that it provides a new and improved step and platform arrangement for such vehicles which is selectively movable between a raised position, wherein the step and platform arrangement forms a closure for the lower part of the vehicle door opening, and either of two operative positions providing boarding means at a high or low level. Another feature of this invention is that it provides a new and improved step and platform arrangement for passenger-carrying vehicles wherein one operative position of the arrangement provides a platform extending from the vehicle at the floor level thereof providing for passenger movement to and from a high-level boarding station substantially above ground level, and the other operative position of the arrangement provides a plurality of steps between ground level and vehicle floor level. Yet another feature of this invention is that it provides a new and improved step and platform arrangement for vehicles including a step structure operative in the aforementioned raised position to provide a covering for the stepwell in the vehicle floor which houses the step and platform arrangement and operative in the aforementioned lowered position to form an intermediate step below vehicle floor level.

These and other features of this invention will be readily apparent from the following specification and drawings wherein:

FIG. 1 is a partial side elevational view of a bus type vehicle having a step and platform arrangement according to this invention;

FIG. 2 is an enlarged perspective view of a portion of FIG. 1 showing the step and platform arrangement in raised and retracted positions;

FIG. 3 is an enlarged perspective view similar to FIG. 2 showing the step and platform arrangement lowered to low-level step position;

FIG. 4 is an enlarged perspective view similar to FIG. 2 showing the step and platform arrangement extended to the high level platform position; and FIG. 5 is an enlarged partially broken away perspective view of a portion of FIG. 2.

Referring now particularly to FIG. 1 of the drawings, a bus-type vehicle designated generally as 10 includes a body structure of generally conventional nature including a forward door opening 12, the upper portion of which is adapted for reception of a swingable door 14 suitably hinged adjacent its forward edge for swinging movement between its opened and closed positions by a conventional door operator structure as is known in the art. The lower portion of door opening 12 is closed by a step and platform arrangement 16 according to this invention.

Referring now to FIGS. 2 and 3, the body structure of the bus 10 has interiorly thereof a cavity or stepwell 18 adjacent the lower portion of door opening 12 and formed partially by suitable bulk head structures in the bus body and by opening 20 in the vehicle floor panel 22. The step and platform arrangement 16 is mounted within stepwell 18 for movement between a raised position shown in FIG. 2 and either of two passenger-loading positions as will be described.

The step and platform arrangement includes a frame, designated 24, formed generally by a pair of spaced plate members 26 each of which is pivotally mounted by brackets 28 to a rigid support structure within the bus body such as a longitudinal frame member 30. As will appear hereinafter, the step and platform frame 24 is moved between its positions by suitable remote control apparatus such as a hydraulic cylinder and piston actuator 32 extending between the stop and platform frame 24 and the bus body.

Referring now to FIGS. 4 and 5, the step and platform frame 24 has swingably mounted thereon a platform member 34 of generally hollow construction and including an outer panel 36 and an inner panel 38 joined by end surface 40. The platform member is mounted for swinging movement relative to spaced plate members 26 by a journaling rod 42 fixed at either end to one of the spaced plate members and pivotally supporting platform member 34. The platform member may be power operated for movement relative to step and platform frame 24 between a retracted position shown in FIG. 2 and an extended position shown in FIG. 4 or may be moved manually therebetween. The platform member 34 preferably is held in retracted position by a latch structure, not shown, between the platform member and the two plate members 26. One form of remotely operable power apparatus for moving the platform member 34 between its positions is shown in FIG. 5 and includes a sector 44 fixed to rod 42 and meshed with pinion gear 46 rotatably mounted within the platform member and driven by a suitable reversible electric motor operated through flexible cable 48 so that pinion 46 in either direction of rotation travels over sector 44 carrying the platform member 34 in the corresponding direction relative to rod 42 and step and platform frame 24.

As shown in FIG. 2, step and platform frame 24 has pivotally mounted thereon by pivots 50 a step panel 52 including a tread surface 54 a beveled edge 56 and an outboard-supported edge 58. In the raised position of step and platform frame 24, FIGS. 2 and 4, step panel 52 forms a horizontal closure and step surface in stepwell floor opening 20 having a central support at pivots 50, an outboard support at edge 58 resting on notch surfaces 60 of plate members 26 and an inboard support at beveled edge 56 resting on complimentary beveled edge 62 of vehicle floor 22. A rotational bias is placed on step panel 52 such as by springs, not shown, between the step panel and step and platform frame 24 so that the step panel tends to rotate counterclockwise relative thereto about pivots 50 as viewed in FIG. 2.

As seen in FIGS. 2 and 3, a step riser 64 is rigidly attached underneath step panel 52 and in the raised position of step and platform frame 24 is concealed within the frame and oriented in a generally vertical attitude while in the lowered position of the frame is exposed and oriented in a generally vertical attitude.

A support rod 66 is suitably fixed at each end, such as, to body bulk heads forming the sides of the stepwell. In the lowered position of step and platform frame 24, FIG. 3, step panel 52 forms a horizontal step surface below vehicle floor level having a central support at pivots 50 and an inboard support at edge 58 resting on support rod 66.

In description now of the operation of the step and platform arrangement of this invention, its normal or retracted position, as where the vehicle is in motion, is shown in FIGS. 1 and 2 wherein step and platform frame 24 is raised and the platform member 34 is retracted relative thereto so that platform end surface 40 is in sealing engagement with the lower surface of door 14 to provide a weathertight seal along the lower edge of the door. Further, the external configuration of platform member 34 and of step and platform frame 24 coincides with the configuration of the vehicle body surrounding the door opening to provide continuity of appearance across the lower portion of the door opening 12. In the event that the step and platform arrangement becomes immobile in the position shown in FIGS. 1 and 2, door 14 may nevertheless be swung open and passengers may exit over raised platform member 34.

With vehicle 10 at an elevated passenger platform the operator swings door 14 open and activates the reversible electric motor within platform member 34 to rotate platform member 34 relative to raised step and platform frame 24 to its extended position, FIG. 4, thereby providing a platform extending horizontally from the vehicle at the level of vehicle floor and the step panel 52, the latter closing stepwell floor opening 20. Reverse actuation of the reversible electric motor brings platform member 34 back to its normal position.

With vehicle 10 at a ground level passenger station the operator swings door 14 open and actuates hydraulic cylinder 32 to rotate step and platform frame 24 counterclockwise from the raised position of FIG. 2 to the lowered position of FIG. 3. Since step panel 52 is rotationally biased into engagement with notch surfaces 60 of step and platform frame 24, frame 24 and step panel 52 initially move counterclockwise as a unit with no relative movement therebetween thereby lifting beveled edge 56 up and away from complimentary beveled edge 62 of floor 22. Movement of the step and platform frame and step panel as a unit continues until supported edge 58 of the step panel contacts support rod 66 at which time the step panel begins to rotate clockwise relative to step and platform frame 24 about pivots 50. This pattern of movement continues until step and platform frame 24 reaches its fully lowered position, FIG. 3, at which time step panel 52 forms an intermediate horizontal step surface below vehicle floor level, supported at rod 66 and pivots 50, and inner panel 38 of retracted platform member 34 forms the tread of a low-level horizontal step surface below the intermediate step.

Following ground level passenger ingress and/or egress, hydraulic cylinder 32 is actuated for clockwise rotation of step and platform frame 24. Edge 58 of step panel 52 remains in contact with support rod 66 as under the urging of the counterclockwise rotational bias placed on the step panel and therefore rotates counterclockwise about pivot 50 relative to step and platform frame 24 during initial clockwise rotation of the frame. This pattern of movement continues until edge 58 of step panel 52 is picked up by notch surfaces 60 on step and platform frame 24 from which point the frame and step panel move clockwise as a unit with no relative movement therebetween until the frame is fully raised, FIG. 2, at which point the step panel forms a horizontal closure in stepwell floor opening 20 with beveled edge 56 resting on complimentary beveled edge 62 of floor 22.

I claim:

1. In a vehicle body having a door opening and a door closing a portion of said opening, a step and platform arrangement, comprising: a frame; means swingably mounting said frame on said body adjacent said opening for movement between raised and lowered positions; a platform; and means mounting said platform on said frame for movement as a unit therewith and movement relative thereto between retracted and extended positions, said frame in the raised position thereof and said platform in the retracted position thereof providing a closure for the remainder of said door opening contiguous with the door and with the portions of said body adjacent said opening, said platform upon movement from the retracted to the extended position thereof with said frame in the raised position thereof providing a high-level step projecting laterally outwardly from said opening, said frame with said platform in the retracted position thereof being swingable as a unit from the raised to the lowered position to provide a low-level step at a position on said body below that of said platform in said projected position thereof.

2. In a vehicle body having a door opening and a door closing a portion of said opening, a step and platform arrangement comprising: a frame; means swingably mounting said frame on said body adjacent said opening for movement between raised and lowered positions; a step panel; means mounting said panel on said frame for movement as a unit therewith and movement relative thereto such that said panel in the raised position of said frame forms a first generally horizontal step surface and in the lowered position of said frame forms a second generally horizontal step surface at a position on said body below that of said first step surface; a platform; and means mounting said platform on said frame for movement as a unit therewith and movement relative thereto between retracted and extended positions, said platform upon movement from the retracted to the extended position thereof with said frame in the raised position thereof providing a second horizontal step surface projecting laterally outwardly from said opening generally at the level of said first step surface, said platform when in the retracted position and upon swinging movement as a unit with said frame from the raised to the lowered position of the latter providing a low-level step at a position on said body below that of said second horizontal step surface formed by said panel.

3. In a vehicle body having a door opening and a floor provided with a stepwell, a step and platform arrangement comprising: a frame; means swingably mounting said frame on said body within said stepwell for movement between raised and lowered positions; a step panel; means mounting said panel on said frame for movement as a unit therewith and movement relative thereto, said panel in the raised position of said frame forming a horizontal surface generally in the plane of said floor to cover said stepwell and in the lowered position of said frame forming a horizontal step surface at a position on said body below said floor; a platform; and means mounting said platform on said frame for movement relative thereto between retracted and extended positions, said platform upon movement from the retracted to the extended position thereof with said frame in the raised position thereof providing a high level platform projecting laterally from said cover surface generally in the plane thereof and of said floor, said platform when in the retracted position thereof and upon swinging movement as a unit with said frame from the raised to the lowered position of the latter providing a low-level step at a position on said body below that of said horizontal step surface formed by said panel.

4. A step and platform arrangement as recited in claim 2 further including first means selectively operable for driving said frame between raised and lowered positions and second means selectively operable for driving said platform between extended and retracted positions.

5. In a vehicle body having a door opening, a door closing a portion of said opening and a floor provided with a stepwell adjacent said door opening, a step and platform arrangement comprising: a frame; means swingably mounting said frame on said vehicle for movement between raised and lowered positions; first actuating means for driving said frame between said raised and lowered positions; a panel; means mounting said panel on said frame for movement as a unit therewith and pivotal movement relative thereto, said panel in the raised position of said frame forming a horizontal cover surface generally in the plane of said floor to cover said stepwell and in the lowered position of said frame forming a generally horizontal step surface at a position on said body below said floor; a platform; means pivotally mounting said platform on said frame for movement as a unit therewith and movement relative thereto between extended and retracted positions, said frame in the raised position thereof and said platform in the retracted position thereof providing a closure for the remainder of said door opening contiguous with the door and with the portion of said body adjacent said opening, said platform upon movement from the retracted to the extended position thereof with said frame in the raised position thereof providing a high-level platform projecting laterally outwardly from said opening and said cover surface generally in the plane thereof and of said floor, said platform when in the retracted position and upon swinging movement as a unit with said frame from the raised to the lowered position of the latter providing a low level step at a position on said body below that of said step surface formed by said panel; and second driving means for driving said platform between said retracted and extended positions relative to said frame.